(12) United States Patent
Habib et al.

(10) Patent No.: US 9,037,991 B2
(45) Date of Patent: May 19, 2015

(54) APPARATUS AND METHOD FOR DIGITAL CONTENT NAVIGATION

(75) Inventors: Babur Habib, San Francisco, CA (US); Osman Rashid, Fremont, CA (US); Bradley S. Hochberg, San Jose, CA (US); Kyrie Robinson, Palo Alto, CA (US); Ann Sydeman, Woodside, CA (US); Paul S. Chambers, San Jose, CA (US); Mohnish Rao, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/117,080

(22) Filed: May 26, 2011

(65) Prior Publication Data

US 2011/0296344 A1 Dec. 1, 2011

Related U.S. Application Data

(60) Provisional application No. 61/396,789, filed on Jun. 1, 2010.

(51) Int. Cl.
| | | |
|---|---|---|
| *G06F 3/048* | (2013.01) | |
| *G06F 1/16* | (2006.01) | |
| *G06F 3/0488* | (2013.01) | |

(52) U.S. Cl.
CPC ............ *G06F 1/1616* (2013.01); *G06F 1/1643* (2013.01); *G06F 3/04883* (2013.01)

(58) Field of Classification Search
CPC ... G06F 17/2247; G06F 3/0482; G06F 3/048; G06F 3/04883; G06F 3/0488; G06F 3/016; G06F 3/0485

USPC ........... 715/810, 702, 234; 345/158, 173, 629
See application file for complete search history.

(56) References Cited

U.S. PATENT DOCUMENTS

| | | | |
|---|---|---|---|
| 3,132,911 | A | 5/1964 | Heidler |
| 4,163,303 | A | 8/1979 | Hanna |
| 4,619,304 | A | 10/1986 | Smith |
| 4,633,436 | A | 12/1986 | Flurry |
| 4,821,373 | A | 4/1989 | Maidment et al. |
| 5,355,555 | A | 10/1994 | Zarelius |
| 5,410,779 | A | 5/1995 | Esman et al. |
| 5,461,581 | A * | 10/1995 | Hallwirth et al. ............ 714/819 |
| 5,610,825 | A * | 3/1997 | Johnson et al. ................ 702/76 |
| 5,714,971 | A * | 2/1998 | Shalit et al. ................... 715/804 |
| 5,819,032 | A * | 10/1998 | de Vries et al. ............... 709/250 |
| 5,870,552 | A * | 2/1999 | Dozier et al. ................. 709/219 |

(Continued)

OTHER PUBLICATIONS

Microsoft Word - Split Function - Feb. 28, 2010.*

(Continued)

*Primary Examiner* — Doon Chow
*Assistant Examiner* — David Choi
(74) *Attorney, Agent, or Firm* — Schwabe, Williamson & Wyatt, P.C.

(57) ABSTRACT

An electronic device includes a processor, a memory for storing digital content and a display. The processor forms a content navigation bar for the digital content. The content navigation bar is rendered on the display and includes a first section marker corresponding to a first section of the digital content. A set of page markers corresponds to pages within the first section of the digital content. The set of page markers includes a boundary page marker. A second section marker is adjacent to the boundary page marker.

20 Claims, 3 Drawing Sheets

(56) References Cited

U.S. PATENT DOCUMENTS

| | | | |
|---|---|---|---|
| 5,870,559 A * | 2/1999 | Leshem et al. | 709/224 |
| 5,893,899 A * | 4/1999 | Johnson et al. | 702/76 |
| 5,920,864 A * | 7/1999 | Zhao | 1/1 |
| 5,958,008 A * | 9/1999 | Pogrebisky et al. | 709/223 |
| 5,987,704 A | 11/1999 | Tang | |
| 6,037,937 A * | 3/2000 | Beaton et al. | 715/764 |
| 6,094,197 A | 7/2000 | Buxton et al. | |
| 6,138,072 A * | 10/2000 | Nagai | 701/454 |
| 6,144,962 A * | 11/2000 | Weinberg et al. | 1/1 |
| 6,157,381 A * | 12/2000 | Bates et al. | 715/786 |
| 6,168,341 B1 | 1/2001 | Chene et al. | |
| 6,237,006 B1 * | 5/2001 | Weinberg et al. | 707/797 |
| 6,288,704 B1 * | 9/2001 | Flack et al. | 345/158 |
| 6,292,188 B1 * | 9/2001 | Carlson et al. | 715/854 |
| 6,377,249 B1 | 4/2002 | Mumford | |
| 6,411,302 B1 | 6/2002 | Chiraz | |
| 6,466,220 B1 | 10/2002 | Cesana et al. | |
| 6,537,103 B2 | 3/2003 | Jamison | |
| 6,647,145 B1 | 11/2003 | Gay | |
| 7,032,187 B2 | 4/2006 | Keely et al. | |
| 7,100,119 B2 | 8/2006 | Keely et al. | |
| 7,158,678 B2 | 1/2007 | Nagel et al. | |
| 7,167,585 B2 | 1/2007 | Gounares et al. | |
| 7,251,413 B2 * | 7/2007 | Dow et al. | 386/248 |
| 7,425,103 B2 | 9/2008 | Perez-Sanchez | |
| 7,427,984 B2 | 9/2008 | Smirnov et al. | |
| 7,450,114 B2 * | 11/2008 | Anwar | 345/179 |
| 7,477,205 B1 | 1/2009 | de Waal et al. | |
| 7,480,858 B2 * | 1/2009 | Chen et al. | 715/234 |
| 7,576,730 B2 * | 8/2009 | Anwar | 345/173 |
| 7,689,928 B1 | 3/2010 | Gilra | |
| 7,735,104 B2 * | 6/2010 | Dow et al. | 725/52 |
| 7,757,184 B2 * | 7/2010 | Martin et al. | 715/810 |
| 7,774,358 B2 * | 8/2010 | Tamas et al. | 707/770 |
| 7,873,243 B2 | 1/2011 | Cohen et al. | |
| 7,886,233 B2 * | 2/2011 | Rainisto et al. | 715/773 |
| 7,889,186 B2 | 2/2011 | Nishimura et al. | |
| 8,140,560 B2 * | 3/2012 | Dinn | 707/765 |
| 8,155,498 B2 * | 4/2012 | Dow et al. | 386/221 |
| 8,200,796 B1 | 6/2012 | Margulis | |
| 8,340,476 B2 | 12/2012 | Cohen et al. | |
| 8,407,606 B1 | 3/2013 | Davidson et al. | |
| 8,510,677 B2 * | 8/2013 | van Os | 715/835 |
| 8,576,222 B2 | 11/2013 | Handley et al. | |
| 8,599,174 B2 | 12/2013 | Cohen et al. | |
| 8,749,480 B2 | 6/2014 | Cohen et al. | |
| 2001/0005207 A1 | 6/2001 | Muikaichi et al. | |
| 2002/0011990 A1 * | 1/2002 | Anwar | 345/173 |
| 2002/0024506 A1 * | 2/2002 | Flack et al. | 345/169 |
| 2002/0067319 A1 | 6/2002 | Hensel | |
| 2002/0080195 A1 * | 6/2002 | Carlson et al. | 345/853 |
| 2002/0109668 A1 | 8/2002 | Rosenberg et al. | |
| 2002/0113823 A1 * | 8/2002 | Card et al. | 345/776 |
| 2002/0133906 A1 | 9/2002 | Fedon | |
| 2003/0030852 A1 * | 2/2003 | Sampson et al. | 358/479 |
| 2003/0202772 A1 * | 10/2003 | Dow et al. | 386/46 |
| 2003/0202773 A1 * | 10/2003 | Dow et al. | 386/46 |
| 2003/0214491 A1 | 11/2003 | Keely et al. | |
| 2004/0080498 A1 | 4/2004 | Fujiwara et al. | |
| 2004/0194014 A1 * | 9/2004 | Anwar | 715/500 |
| 2004/0221311 A1 * | 11/2004 | Dow et al. | 725/52 |
| 2004/0257369 A1 | 12/2004 | Fang | |
| 2005/0010871 A1 * | 1/2005 | Ruthfield et al. | 715/712 |
| 2005/0051350 A1 | 3/2005 | Porter et al. | |
| 2005/0052427 A1 * | 3/2005 | Wu et al. | 345/173 |
| 2005/0078098 A1 | 4/2005 | Dresevic et al. | |
| 2005/0079477 A1 * | 4/2005 | Diesel et al. | 434/350 |
| 2005/0162413 A1 | 7/2005 | Dresevic et al. | |
| 2005/0183031 A1 * | 8/2005 | Onslow | 715/805 |
| 2006/0028457 A1 | 2/2006 | Burns | |
| 2006/0061551 A1 * | 3/2006 | Fateh | 345/158 |
| 2006/0152496 A1 * | 7/2006 | Knaven | 345/172 |
| 2006/0159345 A1 | 7/2006 | Clary et al. | |
| 2006/0184901 A1 * | 8/2006 | Dietz | 715/855 |
| 2006/0239505 A1 | 10/2006 | Bjorklund et al. | |
| 2006/0244738 A1 | 11/2006 | Nishimura et al. | |
| 2006/0253493 A1 * | 11/2006 | Tamas et al. | 707/104.1 |
| 2006/0256139 A1 * | 11/2006 | Gikandi | 345/689 |
| 2006/0274086 A1 * | 12/2006 | Forstall et al. | 345/629 |
| 2006/0277460 A1 * | 12/2006 | Forstall et al. | 715/513 |
| 2006/0284851 A1 | 12/2006 | Pittman | |
| 2006/0294466 A1 * | 12/2006 | Muller et al. | 715/719 |
| 2007/0061707 A1 * | 3/2007 | Sally et al. | 715/513 |
| 2007/0094267 A1 * | 4/2007 | Good et al. | 707/10 |
| 2007/0132763 A1 | 6/2007 | Chu et al. | |
| 2007/0180397 A1 | 8/2007 | Hoyer et al. | |
| 2007/0180471 A1 * | 8/2007 | Unz | 725/52 |
| 2007/0247445 A1 | 10/2007 | Lynggaard et al. | |
| 2007/0256031 A1 * | 11/2007 | Martin et al. | 715/854 |
| 2007/0291017 A1 | 12/2007 | Syeda-Mahmood et al. | |
| 2008/0076472 A1 * | 3/2008 | Hyatt | 455/557 |
| 2008/0078055 A1 | 4/2008 | Estlander | |
| 2008/0150946 A1 | 6/2008 | Kuo | |
| 2008/0165255 A1 * | 7/2008 | Christie et al. | 348/207.99 |
| 2008/0180409 A1 | 7/2008 | Matsuda | |
| 2008/0243808 A1 * | 10/2008 | Rieman et al. | 707/5 |
| 2008/0296074 A1 | 12/2008 | Hollstron et al. | |
| 2009/0015793 A1 * | 1/2009 | Suzuki et al. | 353/19 |
| 2009/0021493 A1 | 1/2009 | Marggraff et al. | |
| 2009/0044236 A1 * | 2/2009 | Bendiabdallah et al. | 725/87 |
| 2009/0063960 A1 * | 3/2009 | Anwar | 715/255 |
| 2009/0083618 A1 * | 3/2009 | Campbell | 715/226 |
| 2009/0083655 A1 | 3/2009 | Beharie et al. | |
| 2009/0100380 A1 * | 4/2009 | Gardner et al. | 715/854 |
| 2009/0161958 A1 | 6/2009 | Markiewicz et al. | |
| 2009/0184972 A1 | 7/2009 | Weybrew et al. | |
| 2009/0198132 A1 | 8/2009 | Pelissier et al. | |
| 2009/0199123 A1 | 8/2009 | Albertson et al. | |
| 2009/0204663 A1 * | 8/2009 | Patwari | 709/203 |
| 2009/0213085 A1 | 8/2009 | Zhen et al. | |
| 2009/0241054 A1 | 9/2009 | Hendricks | |
| 2009/0324082 A1 | 12/2009 | Liu et al. | |
| 2010/0077059 A1 * | 3/2010 | Shen | 709/219 |
| 2010/0077343 A1 * | 3/2010 | Uhl et al. | 715/787 |
| 2010/0097331 A1 | 4/2010 | Wu | |
| 2010/0104269 A1 * | 4/2010 | Prestenback et al. | 386/126 |
| 2010/0138875 A1 * | 6/2010 | Johnson et al. | 725/60 |
| 2010/0161653 A1 | 6/2010 | Krasnow | |
| 2010/0175018 A1 * | 7/2010 | Petschnigg et al. | 715/776 |
| 2010/0177047 A1 | 7/2010 | Brenneman et al. | 345/173 |
| 2010/0185948 A1 * | 7/2010 | Anwar | 715/702 |
| 2010/0185975 A1 * | 7/2010 | Anwar | 715/781 |
| 2010/0192062 A1 * | 7/2010 | Anwar | 715/702 |
| 2010/0210332 A1 | 8/2010 | Imai | |
| 2010/0211866 A1 * | 8/2010 | Nicholas et al. | 715/234 |
| 2010/0245295 A1 | 9/2010 | Kimpara | |
| 2010/0259494 A1 | 10/2010 | Kii | |
| 2010/0278504 A1 * | 11/2010 | Lyons et al. | 386/52 |
| 2010/0281372 A1 * | 11/2010 | Lyons et al. | 715/720 |
| 2010/0281384 A1 * | 11/2010 | Lyons et al. | 715/723 |
| 2010/0289820 A1 | 11/2010 | Hoyer et al. | |
| 2010/0309131 A1 | 12/2010 | Clary | |
| 2010/0315266 A1 * | 12/2010 | Gunawardana et al. | 341/22 |
| 2011/0018821 A1 | 1/2011 | Kii | |
| 2011/0066965 A1 * | 3/2011 | Choi | 715/776 |
| 2011/0090155 A1 | 4/2011 | Caskey et al. | |
| 2011/0122081 A1 * | 5/2011 | Kushler | 345/173 |
| 2011/0145724 A1 * | 6/2011 | Tsai et al. | 715/748 |
| 2011/0148892 A1 | 6/2011 | Shreiner et al. | |
| 2011/0167369 A1 * | 7/2011 | van Os | 715/769 |
| 2011/0185318 A1 | 7/2011 | Hinckley et al. | |
| 2011/0191719 A1 | 8/2011 | Hinckley et al. | |
| 2011/0199297 A1 | 8/2011 | Antonyuk et al. | |
| 2011/0202856 A1 | 8/2011 | Handley et al. | |
| 2011/0209058 A1 * | 8/2011 | Hinckley et al. | 715/702 |
| 2011/0261060 A1 | 10/2011 | Waibel et al. | |
| 2011/0289444 A1 * | 11/2011 | Winsky | 715/776 |
| 2011/0292042 A1 | 12/2011 | Vaganov | |
| 2011/0296344 A1 * | 12/2011 | Habib et al. | 715/810 |
| 2011/0320950 A1 * | 12/2011 | Rajput et al. | 715/728 |
| 2012/0023433 A1 * | 1/2012 | Choi et al. | 715/773 |
| 2012/0032886 A1 * | 2/2012 | Ciesla et al. | 345/168 |

(56) References Cited

U.S. PATENT DOCUMENTS

2012/0036468 A1* 2/2012 Colley .................. 715/773
2012/0090135 A1 4/2012 Soh
2012/0144283 A1 6/2012 Hill et al.

OTHER PUBLICATIONS

Office Action mailed Apr. 15, 2013 for U.S. Appl. No. 13/117,087, 11 pages.
Final Office Action mailed Aug. 2, 2013 for U.S. Appl. No. 13/117,087, 7 pages.
Office Action mailed Aug. 5, 2014 for U.S. Appl. No. 13/117,087, 10 pages.
Office Action mailed Aug. 22, 2012 for U.S. Appl. No. 13/149,868, 10 pages.
Final Office Action mailed Jan. 15, 2013 for U.S. Appl. No. 13/149,868, 12 pages.
Office Action mailed Jun. 6, 2013 for U.S. Appl. No. 13/149,868, 16 pages.
Office Action mailed Aug. 13, 2014 for U.S. Appl. No. 13/149,868, 12 pages.
Office Action mailed Dec. 28, 2012 for U.S. Appl. No. 13/149,887, 9 pages.
Final Office Action mailed May 22, 2013 for U.S. Appl. No. 13/149,887, 11 pages.
Song Ho Ahn, "OpenGL Frame Buffer Object (FBO)", 2008, http://wayback.archive.org/web/20080822025141/http://ww.songho.ca/opengl/gl_fbo.html.
Final Office Action mailed Oct. 17, 2014 for U.S. Appl. No. 12/964,660, 51 pages.
Final Office Action mailed Jan. 9, 2014 for U.S. Appl. No. 13/149,868, 21 pages.
Office Action mailed Jun. 6, 2014 for U.S. Appl. No. 12/964,660, 15 pages.
Final Office Action mailed Nov. 26, 2014 for U.S. Appl. No. 13/117,087, 9 pages.

* cited by examiner

APPARATUS AND METHOD FOR DIGITAL CONTENT NAVIGATION

CROSS-REFERENCE TO RELATED APPLICATION

This application claims priority to U.S. Provisional Patent Application 61/396,789 filed Jun. 1, 2010, entitled "Electronic Device for Education", the contents of which are incorporated herein by reference.

FIELD OF THE INVENTION

This invention relates generally to electronic devices. More particularly, the invention relates to digital content navigation in an electronic device.

BACKGROUND OF THE INVENTION

Since more and more reading content is consumed on electronic devices, there is a growing need for efficient navigation of digital content. Conventional scroll bar navigation techniques do not allow for efficient scanning of information or rapid access of particular portions of lengthy documents.

Accordingly, it is desirable to provide new navigation techniques for digital content.

SUMMARY OF THE INVENTION

An electronic device includes a processor, a memory for storing digital content and a display. The processor forms a content navigation bar for the digital content. The content navigation bar is rendered on the display and includes a first section marker corresponding to a first section of the digital content. A set of page markers corresponds to pages within the first section of the digital content. The set of page markers includes a boundary page marker. A second section marker is adjacent to the boundary page marker.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

The present invention relates to systems and methods for navigating digital content. Although the invention will work equally well for other electronic media, for the purpose of discussion, the example of an electronic book is described. Typically, an electronic book has several sections. One section, for example, could be all of the pages that precede the table of contents (TOC). The TOC itself can be another section. The chapters, index, glossary and any appendices can be sectioned in the same way. Upon loading the electronic book, the sections are segmented and given markers in a content navigation bar. Markers are also given to each of the pages in a section.

Figure 1:
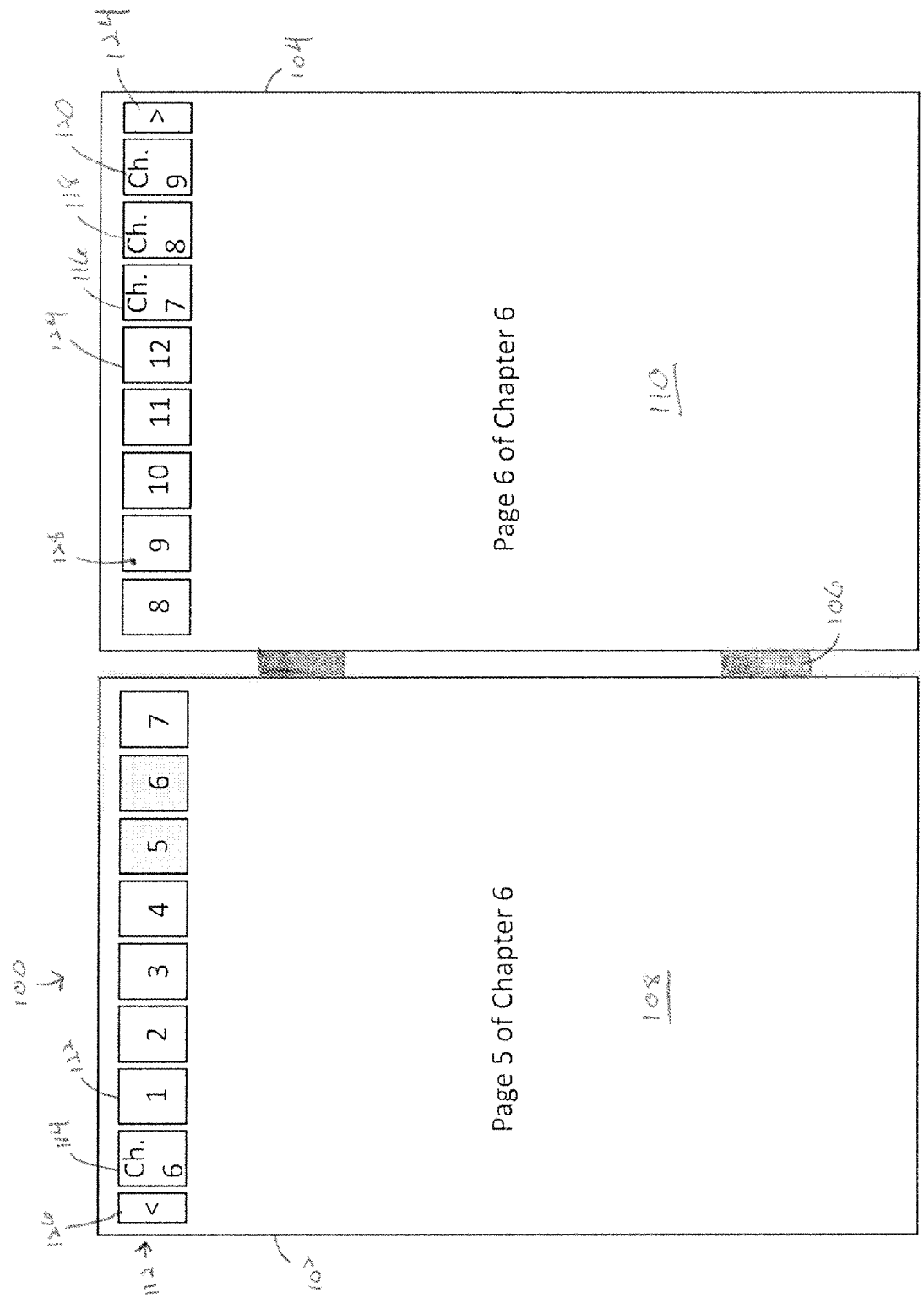
FIG. 1 illustrates a content navigation bar configured in accordance with an embodiment of the invention.

FIG. 1 illustrates an electronic device 100 with a first touch screen 102 and a second touch screen 104. The screens are attached by at least one hinge 106. In this example, the first touch screen 102 display a page 108, while the second touch screen 104 displays another page 110.

A content navigation bar 112 is displayed across the first touch screen 102 and the second touch screen 104. The content navigation bar 112 includes section markers 114, 116, 118 and 120. In addition, the content navigation bar 112 includes individual page markers, such as page marker 122 and boundary page marker 124. The boundary page marker 124 may be the last page in a section or simply represent a boundary to another section of content.

In FIG. 1, the content navigation bare 112 resides near the top of the display screens and is displayed horizontally, but other locations and orientations are possible.

Each section marker may include a label that characterizes the content that it represents, e.g. Table of Contents, Chapter 4, Appendix B, etc. The page markers are included sequentially in the content navigation bar after a section marker. When the number of sections plus number of pages in the current section is greater than the number that can be conveniently displayed, only a subset of the page markers is shown. For example, in FIG. 1. the electronic content displayed is page 5 and 6 of Chapter 6 and the content navigation bar shows page markers for Chapter 6, and section markers for Chapter 7, Chapter 8 and Chapter 9. Preferably, the page markers for page 5 and page 6 of Chapter 6 are visually different from the other markers to indicate the currently displayed digital content.

The portion of the content navigation bar that is not visible can be accessed or displayed in different ways. As the displayed page is changed, for example by page turning, or by accessing a different page though a bookmark or hyperlink, or by selecting a location from the currently displayed portion of the content navigation bar, or by any other means, the displayed markers are updated based on the location of the displayed page. Using a drag or flick gesture to scroll the content navigation bar forwards or backwards can also vary the portion of the content navigation bar that is displayed. In this situation, the displayed pages may not be visible on the navigation control element.

In another embodiment, the current section is expanded such that individual page markers are displayed, starting with the first page of the chapter. When a page in a new chapter is reached, the content navigation bar closes the old chapter (i.e., no longer displays the page markers) and expands the new chapter (i.e., displays page markers for pages in the new chapter). In the case of nested organization levels, each level can be given its own section and corresponding title for use in the content navigation bar.

The content navigation bar provides easy identification of pages without being unduly long. Where a chapter has a large number of pages, a sub-set of pages may be displayed. Alternately, the content navigation bar can be configured to be responsive to gestures, such as drag or flick operations that provide a rapid update of the page markers. In response to a drag or flick operation, content slides according to the speed of the drag or flick.

Control element such as arrows 124 and 126 can be employed for scrolling operations to the left or right. In addition, touching, dragging or a flick action on the content navigation bar can be used to scroll across content. In this manner, the content navigation bar can be easily used to select particular pages. For example, a gesture such as a tap on one of the page markers can be used to select that page to display or tapping on one of the section markers navigates the reader to the first page in the section.

In another aspect of the invention, other commands can be used to obtain more detailed information from the content navigation bar. For example, contact for longer than a predetermined threshold (as opposed to a tap) on a section marker can expand a separate section magnifier (or chapter preview) that shows thumbnails of each of the pages in that section. For example, an extended press of the section maker 114 (or some other applied gesture) invokes the thumbnail panel 130, which includes individual thumbnail representations of pages 132A, 132B, 132C, etc. in chapter 6. A swiping gesture applied to the thumbnail panel 130 results in new pages from the chapter being displayed. Naturally, the thumb nail panel 130 may appear on the first touch screen 102 and/or the second touch screen 104.

Icons or indicators on the thumbnails can be used to indicate features of that page (for example bookmarks, writing, sticky notes, highlighting, a web link etc.). The thumbnails can also include icons that indicate which types of modifications have been made to the page. Tapping on one of the thumbnails can change the display to that page and close the chapter magnifier.

Preferably, the current page (or pages) is highlighted or given a distinguishing feature such that the current page(s) can be easily identified in the content navigation bar. The markers can also indicate whether a particular page has been bookmarked, for example by displaying a bookmark symbol 128 in the upper left corner of the marker. It can be appreciated that other page distinguishing features (such as if the page has highlighting, a web link, a sticky note etc.) can also be indicated on the marker.

Figure 2:
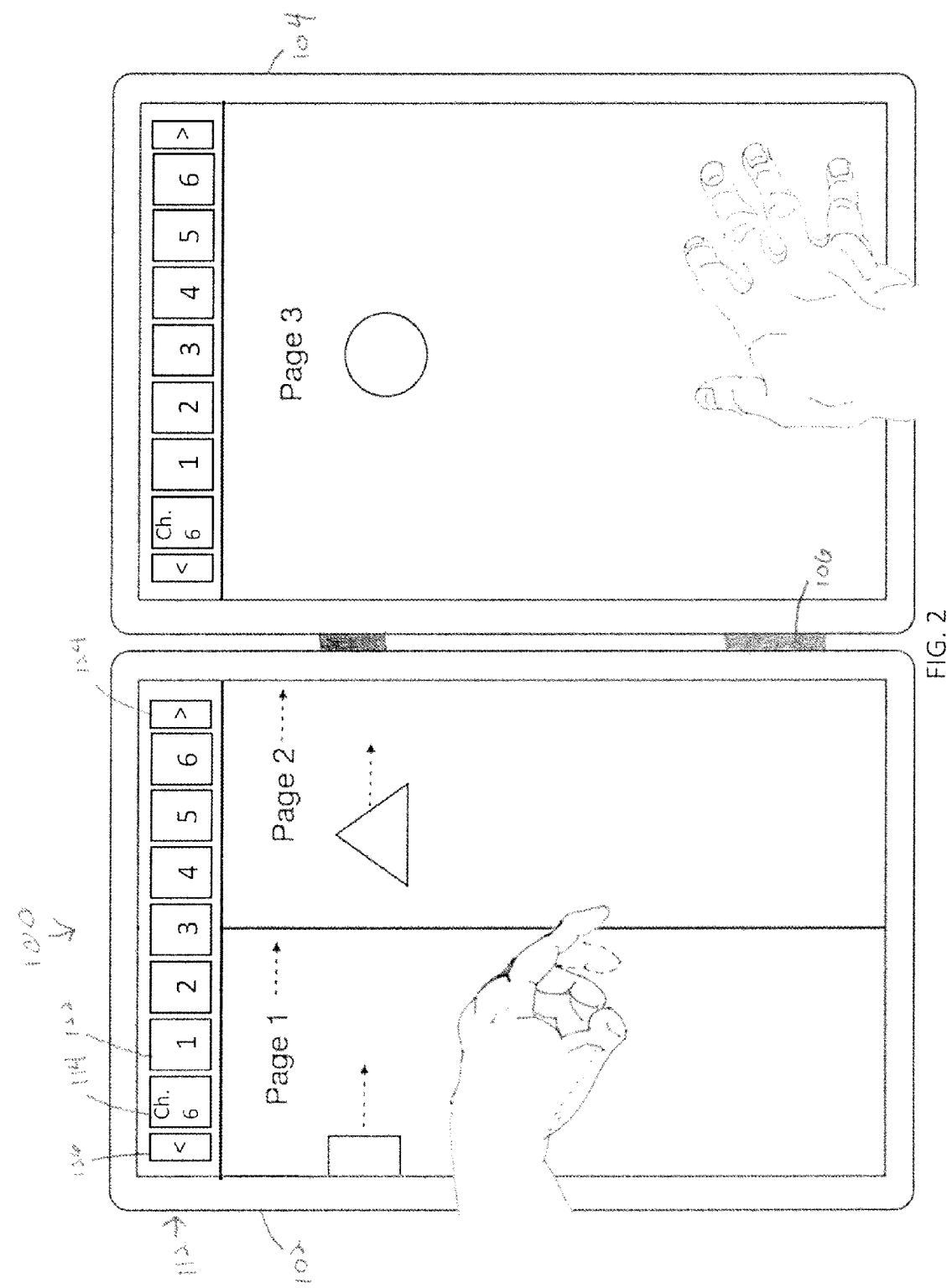
FIG. 2 illustrates a content navigation bar configured in accordance with an alternate embodiment of the invention.

Another aspect of the present invention for a dual display device is the ability to hold a particular page on one screen while browsing though different pages of the electronic content on the opposite screen. As shown in FIG. 2, this could be activated by a multi-finger hold on one panel 102 plus a drag or flick on the opposite panel 104. In this case, the content control bar 112 will automatically split into two components that can be operated independently for each display.

In another aspect of the invention, as the two panels go into single page mode for page turning, a tag or other indication appears on the page marker in each of the two displayed pages. As the pages are moved, the tag moves to the current page. Tapping on the tag on either panel returns the display to two-page mode with the pages correctly ordered. The panel on which the tag was tapped is kept and the other panel is updated to the appropriate page such that the two pages in the display are in the correct consecutive order from left to right. Once this operation of holding one page and turning the other occurs, the two panels continue to operate independently.

This ability to have a split navigation control element allows one to hyperlink to content either within or external to the current electronic content. For example, items in the table of contents are linked to the corresponding page in the book, page numbers in the index are linked to those pages, words appearing in a glossary are linked to the glossary entry, and URLs in the text are linked to a browser external to the current electronic content. When in the hold and turn mode, and the held page has hyperlinks to other locations in the book, tapping on the hyperlinks can navigate the opposite page to that location. A gesture such as a multi-finger hold on the opposite panel can indicate that the link should be displayed on the held page.

Another aspect of the invention is that bookmarks can be added on any page and can be labeled by either typing or writing with a stylus or other device. The bookmarks are then indicated in the content navigation bar and can also be accessed from a separate bookmark menu (and accessed for example by tapping a bookmark icon). Tapping on the bookmark from the list or on the content navigation bar updates the display to the page with the bookmark. In addition to these user added bookmarks, upon loading particular segments or chapters can be added to the bookmark list. For example, the table of contents, index and glossary can be automatically added to the bookmark list.

Figure 3:
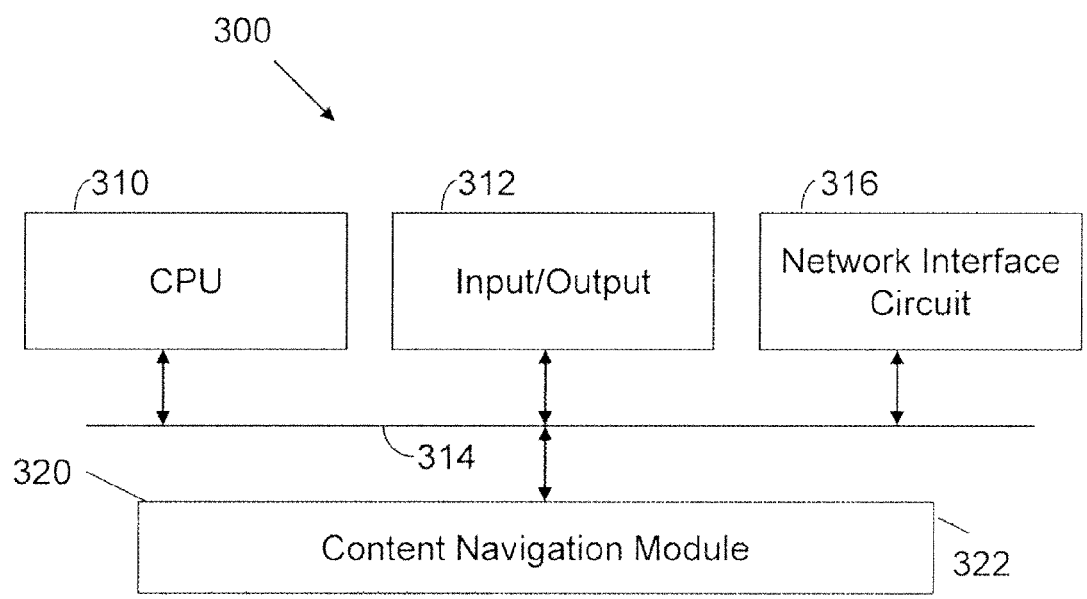
FIG. 3 illustrates an electronic device that may be utilized in accordance with an embodiment of the invention.

FIG. 3 illustrates an electronic device 300 configured in accordance with an embodiment of the invention. The electronic device 300 includes a processor 310 connected to a set of input/output devices 312 via a bus 314. In one embodiment, the input/output devices 312 include at least two touch screens. In addition, the input/output devices 312 may include a keyboard, mouse, speaker, printer and the like. A network interface circuit 316 is also connected to the bus 314 so that the electronic device 300 may operate in a networked environment. A memory 320 is also connected to the bus. The memory 320 includes executable instructions to implement operations of the invention. For example, a content navigation module 322 includes executable instructions to implement operations described throughout this specification and accompanying figures.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An electronic device, comprising:
a processor;
a first touch screen display coupled with the processor;
a second touch screen display coupled with the processor; and
a memory having a content navigation module stored thereon, the content navigation module, when executed by the processor, causes the electronic device to:
display a first segment of a first content navigation bar on at least a portion of the first touch screen display and a second segment of the first content navigation bar on at least a portion of the second touch screen display, wherein the first content navigation bar enables a user of the electronic device to navigate digital content displayed on the first touch screen display and the second touch screen display in a two-page mode, wherein, in the two-page mode, navigation of the digital content on the first touch screen display, via the first content navigation bar, causes a corresponding navigation of the digital content on the second touch screen display and vice versa, and wherein the first content navigation bar comprises a section marker that corresponds with a section of the digital content and a plurality of page markers that correspond with pages of the digital content contained within the section of the digital content; and
detect user input to cause the electronic device to enter a single page mode, wherein the single page mode causes the first segment of the first content navigation bar to become a second content navigation bar and the second segment of the first content navigation bar to become a third content navigation bar, wherein the second content navigation bar and the third content navigation bar enable independent navigation of the digital content on the respective touch screen displays via the second content navigation bar and the third content navigation bar, respectively.

2. The electronic device of claim 1, wherein to detect user input comprises detection of a gesture applied to the first touch screen display and a gesture applied to the second touch screen display.

3. The electronic device of claim 2, wherein the gesture applied to the first touch screen comprises a multi-finger hold and the gesture applied to the second touch screen comprises at least one of a finger drag or a finger flick.

4. The electronic device of claim 1, wherein to detect user input comprises detection of a gesture applied to the first touch screen display in conjunction with activation of a link contained within a portion of the digital content displayed on the first touch screen display, the link identifying another portion of the digital content, and wherein the single page mode further causes the another portion of the digital content to be displayed on the second touch screen display while maintaining the portion of the digital content on the first touch screen display.

5. The electronic device of claim 1, wherein the content navigation module, when executed by the processor, further causes the electronic device to detect another user input to cause the electronic device to return to the two-page mode, wherein to return to the two-page mode causes the second content navigation bar to become the first segment of the first content navigation bar and the third content navigation bar become the second segment of the first content navigation bar.

6. The electronic device of claim 1, wherein the first segment is identical to the second segment.

7. The electronic device of claim 1, wherein the digital content is an electronic book.

8. The electronic device of claim 7, wherein in two-page mode a first page of the book is displayed on the first touch screen display and a second page of the book is displayed on the second touch screen display, the first page and second page being consecutive pages of the electronic book, and wherein the plurality of page markers includes a first page marker corresponding to the first page of the book and a second page marker corresponding to the second page of the book.

9. The electronic device of claim 7, the content navigation module, when executed by the processor, further causes the electronic device to:
detect user input applied to the section marker indicating that the user would like more information on the pages contained within the corresponding section; and
activating a section magnifier comprising thumbnails of the individual pages contained within the corresponding section.

10. The electronic device of claim 9, wherein in single page mode one page of the electronic book is displayed on the first touch screen display and another page of the book is displayed on the second touch screen display, and
wherein the second content navigation bar comprises a first section marker corresponding to a first section of the electronic book and a first plurality of page markers corresponding to pages contained within the first section of the electronic book including the one page of the electronic book displayed on the first touch screen display, and
wherein the third content navigation bar comprises a second section marker corresponding to a second section of the electronic book and a second plurality of page markers corresponding to pages contained within the second section of the electronic book including the another page of the electronic book displayed on the second touch screen display.

11. A computer readable non-transitory storage medium having instructions stored thereon which, when executed by a processor of a computing device, cause the computing device to:
display a first segment of a first content navigation bar on at least a portion of a first touch screen display of the computing device and a second segment of the first content navigation bar on at least a portion of a second touch screen display of the computing device, wherein the first content navigation bar enables a user of the computing device to navigate digital content displayed on the first touch screen display and the second touch screen display in a two-page mode, wherein, in the two-page mode, navigation of the digital content on the first touch screen display, via the first content navigation bar, causes a corresponding navigation of the digital content on the second touch screen display and vice versa, and wherein the first content navigation bar comprises a section marker that corresponds with a section of the digital content and a plurality of page markers that correspond with pages of the digital content contained within the section of the digital content; and
detect user input to cause the computing device to enter a single page mode, wherein the single page mode causes the first segment of the first content navigation bar to become a second content navigation bar and the second segment of the first content navigation to become a third content navigation bar, wherein the second content navigation bar and the third content navigation bar enable independent navigation of the digital content on the respective touch screen displays via the second content navigation bar and the third content navigation bar, respectively.

12. The computer readable storage medium of claim 11, wherein to detect user input comprises detection of a gesture applied to the first touch screen display and a gesture applied to the second touch screen display.

13. The computer readable storage medium of claim 12, wherein the gesture applied to the first touch screen comprises a multi-finger hold and the gesture applied to the second touch screen comprises at least one of a finger drag or a finger flick.

14. The computer readable storage medium of claim 11, wherein to detect user input comprises detection of a gesture applied to the first touch screen display in conjunction with activation of a link contained within a portion of the digital content displayed on the first touch screen display, the link identifying another portion of the digital content, and wherein the single page mode further causes the another portion of the digital content to be displayed on the second touch screen display while maintaining the portion of the digital content on the first touch screen display.

15. The computer readable storage medium of claim 11, wherein the instructions, when executed by the processor, further cause the computing device to detect another user input to cause the computing device to return to the two-page mode, wherein to return to the two-page mode causes the second content navigation bar to become the first segment of the first content navigation bar and the third content navigation bar to become the second segment of the first content navigation bar.

16. The computer readable storage medium of claim 11, wherein the first segment is identical to the second segment.

17. The computer readable storage medium of claim 11, wherein the digital content is an electronic book.

18. The computer readable storage medium of claim 17, wherein in two-page mode a first page of the book is displayed on the first touch screen display and a second page of the book is displayed on the second touch screen display, the first page and second page being consecutive pages of the electronic book, and wherein the plurality of page markers include a first page marker corresponding to the first page of the book and a second page marker corresponding to the second page of the book.

19. The computer readable storage medium of claim 17, wherein the instructions, when executed by the processor, further cause the computing device to:
    detect user input applied to the section marker indicating that the user would like more information on the pages contained within the corresponding section; and
    activate a section magnifier comprising thumbnails of the individual pages contained within the corresponding section.

20. The computer readable storage medium of claim 19, wherein in single page mode one page of the electronic book is displayed on the first touch screen display and another page of the book is displayed on the second touch screen display, and
    wherein the second content navigation bar comprises a first section marker corresponding to a first section of the electronic book and a first plurality of page markers corresponding to pages contained within the first section of the electronic book including the one page of the electronic book displayed on the first touch screen display, and
    wherein the third content navigation bar comprises a second section marker corresponding to a second section of the electronic book and a second plurality of page markers corresponding to pages contained within the second section of the electronic book including the another page of the electronic book displayed on the second touch screen display.

\* \* \* \* \*